United States Patent

[11] 3,549,155

| [72] | Inventor | John R. Ward |
| | | Owings, Md. |
| [21] | Appl. No. | 724,424 |
| [22] | Filed | Apr. 26, 1968 |
| [45] | Patented | Dec. 22, 1970 |
| [73] | Assignee | the United States of America as represented by the Secretary of the Navy |

[54] HELICALLY CUT SLEEVE SEAL
5 Claims, 3 Drawing Figs.

[52] U.S. Cl. .................................................. 277/116,
277/75, 277/203; 92/201
[51] Int. Cl. ..................................................... F16j 15/00,
F16j 9/08
[50] Field of Search ........................................... 277/203,
167, 75, 119, 115, 116

[56] References Cited
UNITED STATES PATENTS

| 2,871,072 | 1/1959 | Parks et al. .................. | 277/203X |
| 3,303,757 | 2/1967 | Ward ............................ | 277/75X |
| 3,442,518 | 5/1969 | Henshaw ...................... | 277/203X |
| 168,344 | 10/1875 | Sage ............................ | 277/115 |

Primary Examiner—Samuel D. Rothberg
Attorneys—L. A. Miller, Q. E. Hodges, A. Sopp and F. A. Lukasik

ABSTRACT: The present invention is a sealing system for high pressure air compressor pistons which will not require fluid lubricants. The piston seal comprises a helically cut, hollow cylinder or sleeve which is deformed at one end, to bear against a stationary compressor cylinder.

3,549,155

INVENTOR
JOHN R. WARD 3,549,155

HELICALLY CUT SLEEVE SEAL

The invention described herein may be manufactured and used by or for the Government of the United States of America for governmental purposes without the payment of any royalties thereon or therefor.

BACKGROUND OF THE INVENTION

The present invention relates to seals and more particularly to an improved seal for pistons, shafts and the like operating under high pressure.

One of the most critical problems confronting developers of air compressors is the hazard of fire or explosion which exists in high pressure air systems when combustible compressor lubricants are present. Filters and solid absorbents reduce the downstream combustion potential by removing much of the carried-over lubricant. These oil extraction devices require diligent servicing to maintain their effectiveness and, under shipboard conditions, it is difficult to determine whether they are functioning correctly. Furthermore, the compressor interstage coolers and interconnecting piping plus all other air piping ahead of these oil-removal devices are potential explosion regions.

SUMMARY

The general purpose of this invention is to provide a sleeve seal that has all of the advantages of similarly employed prior art seals and has none of the above described disadvantages. To attain this, the present invention provides a means to obtain high diametrical enlargement for sleeve seals with a low axial force. The present invention comprises essentially a hollow cylinder or sleeve, formed in a helical pattern, which is deformed at one end to bear against a stationary compressor cylinder. The entire sleeve, made of a deformable, self-lubricating material, is available for wear and no leakage path develops until the entire sleeve is consumed.

An object of the present invention is to provide a self-lubricating seal.

Another object is to provide an oil-free seal suitable for use in high pressure compressors or the like.

A further object of this invention is to provide a seal which is durable and long lasting, and is self adjusting to compensate for such wear as does occur.

Still another object of this invention is to provide a seal which is inexpensive to manufacture and does not require excessive attention to manufacturing tolerances.

A still further object of this invention is to provide a helically shaped seal of the foregoing character which utilizes the sealed pressures to maintain an effective seal and still imposes minimum frictional drag.

Other objects and advantages of the invention will become apparent from the following description of a preferred embodiment thereof read in conjunction with the accompanying sheets of drawings in which.

DESCRIPTION OF THE PREFERRED EMBODIMENT

Figure 1:
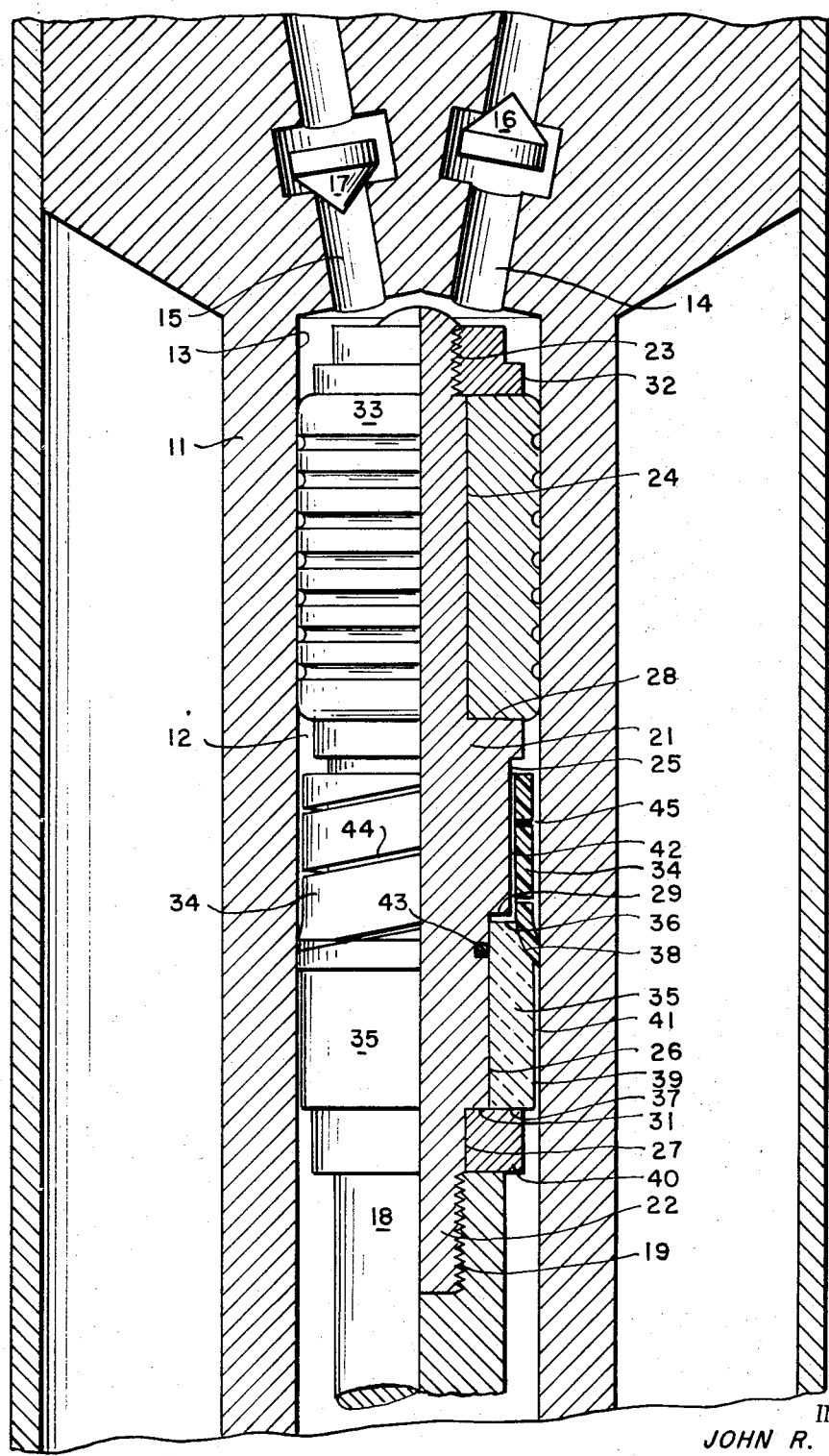
FIG. 1 is a view, partly in section, of a seal embodying the invention shown in association with a portion of a compressor.

FIG. 1 illustrates a seal embodying the invention with reference to exemplary use within an air compressor comprising a cylinder member 11 and a piston 12. The cylinder member 11 has a bore 13 in which the piston 12 is reciprocably toward and from a high pressure zone which is served with inlet and outlet passages 14 and 15 controlled by the valves 16 and 17.

The piston 12 is fitted on a reduced rod portion 24 of a removable piston rod section 21. Threaded end 22 of rod section 21 is threadedly engaged with threaded bore 19 of piston rod 18. Shaft portion 21 also has bearing surfaces 25, 26 and 27 and axially facing shoulders 28, 29, and 31 to provide various gripping and sliding surfaces. A suitable lock nut 32 secures the piston 12 on the rod section 21.

The piston 12 and the rod 18 are guided for reciprocatory movement in the bore 13 by piston guide 33. Piston guide 33 may preferably be fabricated of a carbon-graphite composition fitted relatively tight on bearing surface 24 and relatively tight in cylinder bore 13. Guide 33 serves to align the piston 12 in the cylinder bore 13 and also serves as a pressure pulse buffer.

Disposed in surrounding relationship to bearing surface 26 is an annular follower member 35, which is restrained from axial movement by collar 40 and shoulder 29 of piston rod section 21. An O-ring seal 43 is provided between annular follower member 35 and piston rod section 21 to provide a further internal fluid seal. The follower member 35 is preferably formed of a rigid material, e.g. carbon-graphite composition and fits about the bearing surface 26.

The follower member 35 has axially facing shoulders 36 and 37 at opposite ends to each other. An annular curved surface 38, or taper, begins at shoulder 36 and slopes generally outwardly and away from shoulder 36 and terminates in a cylindrical surface 39. The surface 39 of the follower member 35 is spaced from the surface of the bore 13 by a clearance or annular space indicated at 41.

Figure 2:
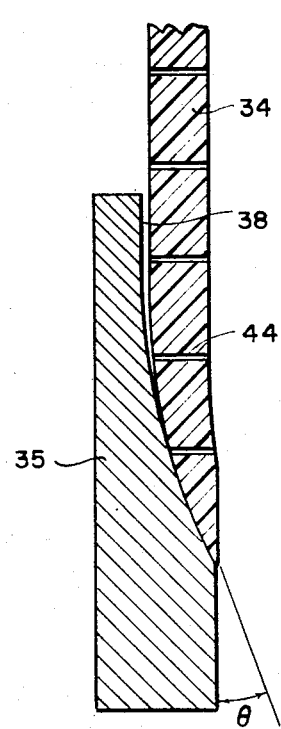
FIG. 2 shows the relationship between a seal and follower in accordance with the invention.
Figure 3:
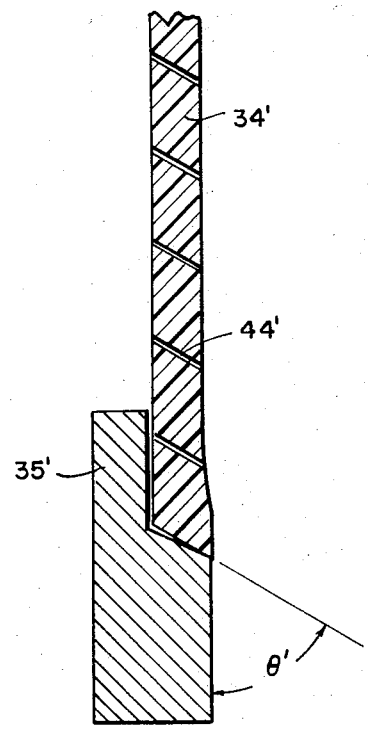
FIG. 3 shows the relationship between a seal and follower of an alternative embodiment in accordance with the invention.

Surrounding the follower member 35 and bearing surface 25 is sealing sleeve 34. The sleeve 34, which is cylindrical throughout a major portion of its length, is of a size providing clearance 42 between it and bearing surface 25. Sleeve 34 also provides clearance 45 between it and the surface of bore 13. Sleeve 34 may be constructed in a helical pattern such as to resemble a helically coiled spring. FIGS. 1 and 2 show the helix as formed by cutting or forming slit 44 at 90° to the longitudinal axis of sleeve 34. FIG. 3 shows an alternative embodiment with the helical slit 44 formed at an angle to the longitudinal axis of sleeve 34. It is to be noted at this point that clearances such as at 41, 42, 43 and 44 are exaggerated in the drawing and are only as large as necessary to provide a substantially friction free sliding fit.

Sleeve 34 is preferably a cold-flowable plastic such as polytetrafluoroethylene (PTFE) including a wear resistant filler such as filamentary or particulate glass. Also, brittle materials which have low elongating properties may be used as sleeve seal materials because the stress levels are lower than with uncut sleeves. Besides having good self-lubricating properties in the 300—500° F. temperature range, the sleeve seal materials used should preferably be capable of considerable elongation. The fluorocarbon group of materials, particularly the filled PTFE materials, offer the best elongation and wear resistance at high operating temperatures. The choice of filler material to be blended with the PTFE resin depends upon the ultimate end use. Among the filler materials which will improve the wear resistance of PTFE are: glass fiber, bronze powders, molydisulfide, asbestos, and carbon. A fibrous filler will, in general, allow a greater ultimate elongation percentage than will an equal volume of a particulate type filler. In a particular model built in accordance with the invention, a sealing sleeve of about 25 percent by weight glass-filled PTFE was used.

The end of the sleeve 34 which is remote from the high pressure end of the bore 13 is deformed outwardly by the curved surface 38 of the follower member 35 into sealing engagement with the surface of bore 13. It will be apparent that the sleeve 34 will be urged axially against the curved surface 38 by a force related to the pressure differential acting across the seal which is effected by the deformed end of the sleeve 34 which bridges the clearance 41 between the follower member 35 and the surface of the bore 13. Axial loading by air pressure, or mechanically, (not shown) enlarges the sleeve 34 diameter at the sealing end. With the sleeve seal 34 formed in a helical fashion and assembled on piston 12, it resembles a fully compressed helical spring. Upon being subjected to pressure in an axial direction, however, unlike the helical spring, sleeve seal 34 uncoils instead of stretching or compressing. The present invention enables sleeve seals to seal off rapidly with less axial force than was previously possible.

A sleeve seal made in accordance with the principles of the invention may be used to seal inwardly, as against a rod or shaft, as well as outwardly as a piston seal, e.g. by providing a cam (curved) surface inwardly instead of outwardly. The number of threads per inch, slits 44, may vary in accordance with the diameter of the sleeve seal and the operating pressures.

Inasmuch as the sleeve 34 is provided with sufficient clearance at 42 and 45 to be substantially free of friction with surfaces 13 and 25, nearly all of the axial force on the sleeve 34 is available to deform the sleeve along the curved surface 38 of the follower 35 into sealing engagement with the bore surface 13. The axial force causes the sleeve 34 to be urged axially along the follower member 35 away from the high pressure so as to continuously compensate for wear of the sleeve 34 against the surface of the bore 13.

FIG. 2 shows an arc of a circle used for the follower member 35 contour in the area of curved surface 38 which contacts sleeve seal 34. The exit angle, defined as Θ in FIGS. 2 and 3, is selected and the radius, FIG. 2, based on the particular follower, sleeve and cylinder dimensions computed. The selection of angle Θ is based on factors related to seal breakage, wear rate, and sealing effectiveness. FIG. 3 shows the follower member 35' inclined at the exit angle Θ' rather than the curved surface 38 in FIG. 2. As the exit angle decreases, the contact area between the follower and the underside of the sleeve 34 and also the contact between the outside of the sleeve and the cylinder wall, both increase. Conversely, as the exit angle Θ decreases, there is an increase in the axial and radial forces which produce sleeve wear.

Surfaces rubbed by seal 34 must be considered as well as the seal itself. The proper selection of cylinder bore 13 or piston rod 18 materials is based primarily on wear, although physical strength must also be considered. Ideally, a film of PTFE is transferred from the seals to the rubbed metal surfaces. The transferred PTFE film then acts as a layer of solid lubricant between the two surfaces. The characteristics of the metal surfaces should be conducive to the formation of this lubricating film. In this regard it has been determined that a cylinder member 11 formed of 1040 low carbon steel, with the surface of the bore 13 plated with dense chromium plating, will result in a small amount of wear in the sleeve 34 when the latter is formed of the above mentioned PTFE.

Thus it has been shown that this invention provides an improved oil free seal for pistons, shafts and the like which satisfies the previously stated objects and advantages.

Of course many modifications, variations and uses of the present invention are possible in the light of the above teachings. It is therefore to be understood that, within the scope of the appended claims, the invention may be practiced otherwise than as specifically described.

I claim:

1. In a piston arrangement within a cylinder requiring high pressure sealing means including:
   a piston;
   a piston rod for actuating said piston;
   an annular follower member disposed about the end of said rod adjacent said piston, said member having an outer curved guide surface; and
   a helical tubular deformable sleeve slidably disposed about said annular member and against said outer curved surface and conformable thereto whereby axial loading on said sleeve forces a portion of said sleeve in contact with said curved guide surface to expand and uncoil thereby forming a fluid seal within said cylinder.

2. In a piston arrangement within a cylinder requiring high pressure sealing means including:
   a piston;
   a piston rod for actuating said piston;
   a follower member longitudinally disposed about an end of said rod adjacent said piston;
   a sealing sleeve means comprising a deformable helical member in contact with and expandable by said follower member into contact with said cylinder thereby forming a high pressure fluid seal;
   said follower including a camming surface having an exit angle, said camming surface supporting said helical member; and wherein
   said helical member includes helical convolutions having mating surfaces disposed at a bias angle with respect to a perpendicular line to the longitudinal axis of said helical member, said bias angle and said exit angle being substantially the same.

3. A piston arrangement as set forth in claim 1 wherein said rod end adjacent said piston has a reduced cross section with respect to at least a portion of the remainder of said rod.

4. A piston arrangement as set forth in claim 1 wherein said sealing sleeve means further comprises a cold-flowable material.

5. A piston arrangement as set forth in claim 4 wherein said cold-flowable material comprises about 25 percent glass fibers and about 75 percent polytetrafluorethylene.